United States Patent
Pietig et al.

(10) Patent No.: US 8,184,774 B2
(45) Date of Patent: May 22, 2012

(54) DUAL-COLOR PYROMETRIC MEASUREMENT OF X-RAY FOCAL SPOT TEMPERATURE

(75) Inventors: Rainer Pietig, Herzogenrath (DE); Christoph Martiny, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/086,425

(22) Filed: Apr. 14, 2011

(65) Prior Publication Data
US 2011/0188536 A1  Aug. 4, 2011

Related U.S. Application Data

(62) Division of application No. 12/294,502, filed as application No. PCT/IB2007/050885 on Mar. 15, 2007, now Pat. No. 7,949,100.

(30) Foreign Application Priority Data

Mar. 29, 2006 (EP) .................................. 06111941

(51) Int. Cl.
  *H01J 35/00* (2006.01)

(52) U.S. Cl. ............................. 378/125; 378/121
(58) Field of Classification Search .............. 378/119, 378/117, 121, 125, 127, 144
See application file for complete search history.

(56) References Cited

U.S. PATENT DOCUMENTS

| 3,062,960 A * | 11/1962 | Laser ............................. 378/93 |
| 3,836,805 A | 9/1974 | Kok |
| 4,675,892 A | 6/1987 | Plessis et al. |
| 2004/0190682 A1 | 9/2004 | Deuringer et al. |
| 2004/0227928 A1 | 11/2004 | Bonne et al. |

FOREIGN PATENT DOCUMENTS

| DE | 1137145 | 9/1962 |
| EP | 0420108 | 4/1991 |
| JP | 57103300 | 6/1982 |

* cited by examiner

*Primary Examiner* — Hoon Song

(57) ABSTRACT

An x-ray tube disclosed here in includes an emitter arranged to emit electrons on to a focal spot on a rotatable anode. The x-ray tube also includes a hollow tube arranged to receive electromagnetic radiation from the focal spot at one end of the hollow tube and transmit it to another end. The x-ray tube also includes two or more sensors arranged to detect the electromagnetic radiation through the hollow tube.

7 Claims, 7 Drawing Sheets

DUAL-COLOR PYROMETRIC MEASUREMENT OF X-RAY FOCAL SPOT TEMPERATURE

CROSS-REFERENCE TO RELATED APPLICATIONS

This application claims the benefit of U.S. application Ser. No. 12/294,502, filed Sep. 25, 2008, the contents of which are incorporated herein by reference.

The invention relates generally to the field of x-ray imaging and more particularly to measurement of temperature of an x-ray focal spot.

X-rays are generated when high velocity electrons from an electron emitter strike the anode within an x-ray tube. The electrons generated by an emitter are accelerated towards the anode when a high voltage is applied between the emitter and the anode. When electrons strike the anode, it causes considerable heating of the anode. By employing a rotatable anode, the heating is spread in space and time. The area in which the electrons strike the anode is termed as the focal spot and in the case of the rotatable anode; the area that is illuminated by the focal spot is in the form of a ring, called the focal spot ring. Further, when compared with the rest of the region on the rotatable anode, the focal spot ring generally experiences greater heating. And within the focal ring, the focal spot is the hottest. In peak operating conditions, the focal spot ring has an average temperature of about 2000 degrees Celsius while the focal spot attains a temperature of about 3000 degrees Celsius. Because of the presence of rotating parts, and the cost of the x-ray tube in general, it is beneficial to constantly monitor the temperature at the focal spot. Such monitoring will aid in the protection of the patient, the radiologist, and the imaging apparatus.

One example of determining the focal spot temperature is by mathematically estimating the temperature based on operating parameters of the x-ray tube. However, a disadvantage associated with the mathematical estimation is that it is not very precise and therefore protection mechanism for the x-ray tube has to be very conservative to compensate for the lack of precision in estimating focal spot temperature. Another example of measuring focal spot temperature in an x-ray tube is presented in U.S. Pat. No. 3,836,805. The document discloses providing a window on a metal end cap of the x-ray tube through which the inner surface of the cup-shaped anode can be viewed by a light detector. The light detector then produces an electrical signal proportional to the intensity of light received by it. Such an arrangement creates opportunities for erroneous determination of focal spot temperature. It would, therefore, be advantageous to accurately detect focal spot temperature.

Accordingly, an x-ray tube disclosed here includes an emitter arranged to emit electrons on to a focal spot on a rotatable anode. The x-ray tube also includes a hollow tube arranged to receive electromagnetic radiation from the focal spot at one end of the hollow tube and transmit it to another end. The x-ray tube also includes two or more sensors arranged to detect the electromagnetic radiation through the hollow tube.

Further, an x-ray imaging apparatus disclosed here includes the x-ray tube as described herein above. The x-ray imaging apparatus also includes a detector of x-rays and an object imaging structure.

Further, a method of determining temperature of focal spot on a rotatable anode includes measuring the intensities of light at two or more wavelengths and determining the temperature of the focal spot based on the measured intensities.

These and various other features, aspects and advantages will be better understood when the following description is read with reference to the figures, wherein FIG. 1 illustrates a first embodiment of an x-ray tube arrangement;

Figure 1:
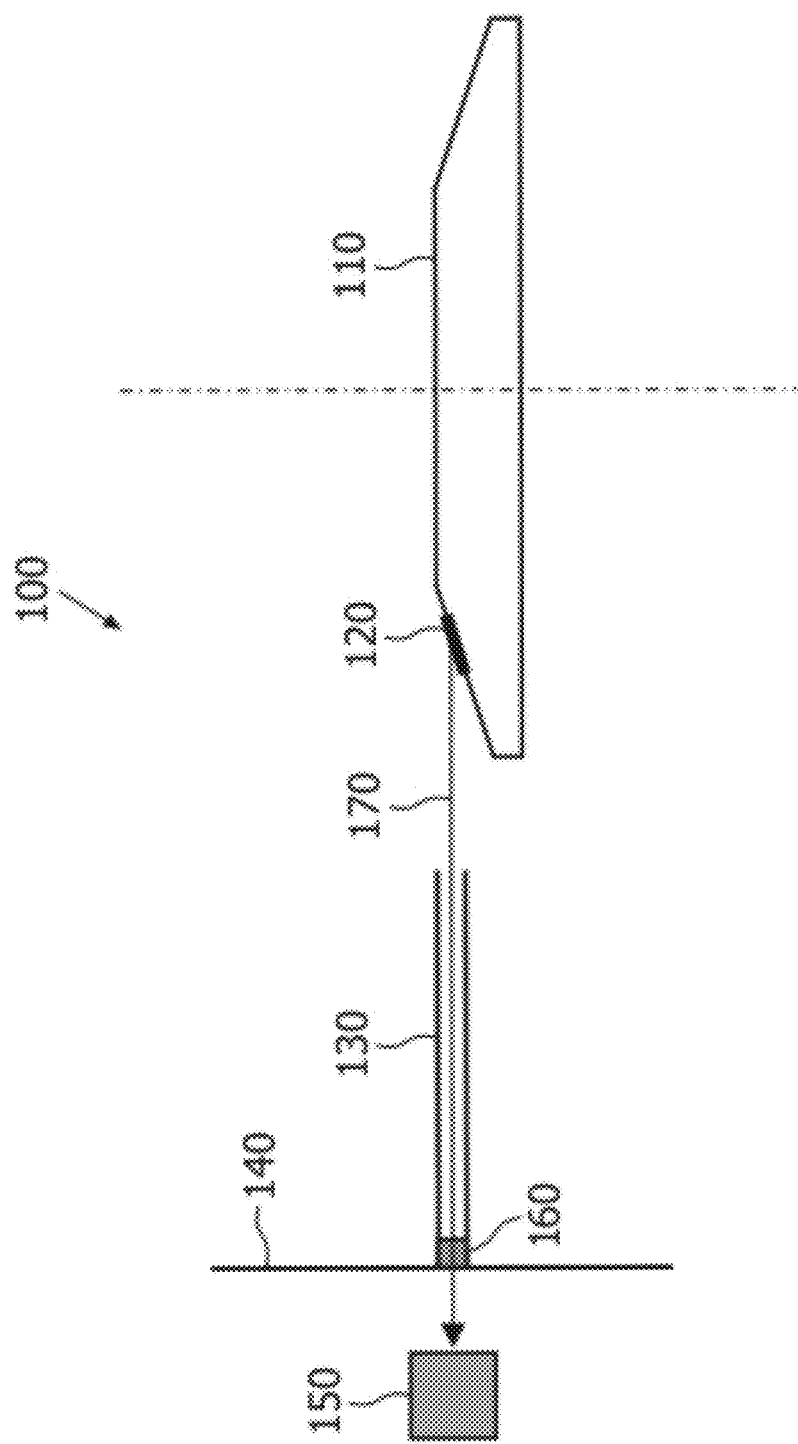

Turning now to the drawings and referring first to FIG. 1, an embodiment of an x-ray tube 100 is shown. Particularly, FIG. 1 illustrates portions of the x-ray tube 100 with a rotatable anode 110 with an x-ray focal spot 120, a hollow tube 130 affixed to the x-ray tube wall 140, and a sensor element 150. A window 160 is present on the x-ray tube wall, at the interface between the x-ray tube wall and the hollow tube. The window 160 should be transparent to any light transmitted through the hollow tube 130. Since the x-ray tube is also highly evacuated, the window 160 should be stable at such low pressure and maintain the vacuum within the x-ray tube 100.

In some embodiments, the window 160 may also include a layer of lead glass. During operation of the x-ray tube, it is possible for some x-rays to escape through the hollow tube and out of the x-ray tube. The lead glass (not shown) is used to absorb such stray x-rays. An additional function of the lead glass is to prevent the x-rays from striking the sensor element 150 because the x-rays could cause the sensor element 150 to erroneously generate a signal due to direct conversion of the x-rays or could even damage the sensor element. It is also possible that when the lead glass is used, some amount of light could also be dispersed or absorbed by the lead glass. However, knowing the absorption and dispersion property of the lead glass, such effects would be compensated through suitable calibration of the sensor element 150.

In the arrangement of FIG. 1, the hollow tube 130 is fully enclosed within the x-ray tube 100. One end of the hollow tube 130 is positioned towards the focal spot 120 while a second and opposite end of the hollow tube 130 is affixed to an inner surface of the window 160, which is the surface of the window 160 that is inside the x-ray tube 100. In the discussions that follow, the end of the hollow tube that is close to the focal spot will be termed as the collector end, while the end of the hollow tube placed farther away from the focal spot will be termed as the emitter end. The hollow tube 130 is coated black on the inside. The length and diameter of the hollow tube 130 is chosen such that only light from the focal spot enters the sensor element. All light emitted from a region other than the focal spot is absorbed by the blackened inner surface of the hollow tube. By this, any light that passes through the hollow tube to the second end of the hollow tube is predominantly the visible light emitted from the focal spot 120.

While visible light 170 from the focal spot 120 travels through the hollow tube, it is also quite possible that some amount of x-rays (not shown) may be transmitted through the emitter end of the hollow tube. The emitter end is affixed to the window 160 on the x-ray tube wall 140 to absorb any stray x-rays that might have entered the hollow tube at the collector end and got transmitted through the hollow tube 130. Furthermore, the window 160 is positioned such that it establishes a line of sight between the focal spot 120 and the sensor element 150 through the hollow tube 130.

The sensor element 150 includes at least two sensors and is situated very close to the x-ray tube wall directly on an exposed surface of the window 160 so that the sensors can detect the visible light that passes through the hollow tube 130 and the window 160. In one embodiment, the sensors are p-i-n junction photodiodes. However, inexpensive silicon p-n junction diodes may also be used. For detection in the optical regime i.e., detecting visible light, the silicon photodiode is a good choice of detector. Advantages of using silicon photodiodes include lower cost of the diodes, ruggedness of the diodes, and ease of integration of the diodes with on-board or off-board electronics. The photodiodes generate currents proportional to the intensity of light that is incident on the photodiodes.

Each of the sensors in the sensor element 150 also includes a narrow band pass filter (not shown) to allow only a specific wavelength of the visible light to be detected by the sensor. The narrow band pass filters allows a different wavelength of light when compared to the narrow band pass filter in the other sensor. An example of a narrow band pass filter is the Fabry-Perot Etalon. These operate as very finely tuned filters. These can for example be fabricated by deposition of stacked thin dielectric layers on top of the sensor diode However, any other suitable narrow band filter may be used.

The two sensors measure the intensity of light at two different wavelengths and therefore generate two different currents. Knowing the light intensity at two different wavelengths (or frequencies) allows the determination of the measured temperature without knowing the emission coefficient. This is achieved by taking a ratio of the two currents that are measured by the two sensors. The unknown emission coefficient, which is the same for both the measurement, gets canceled out.

Figure 2:
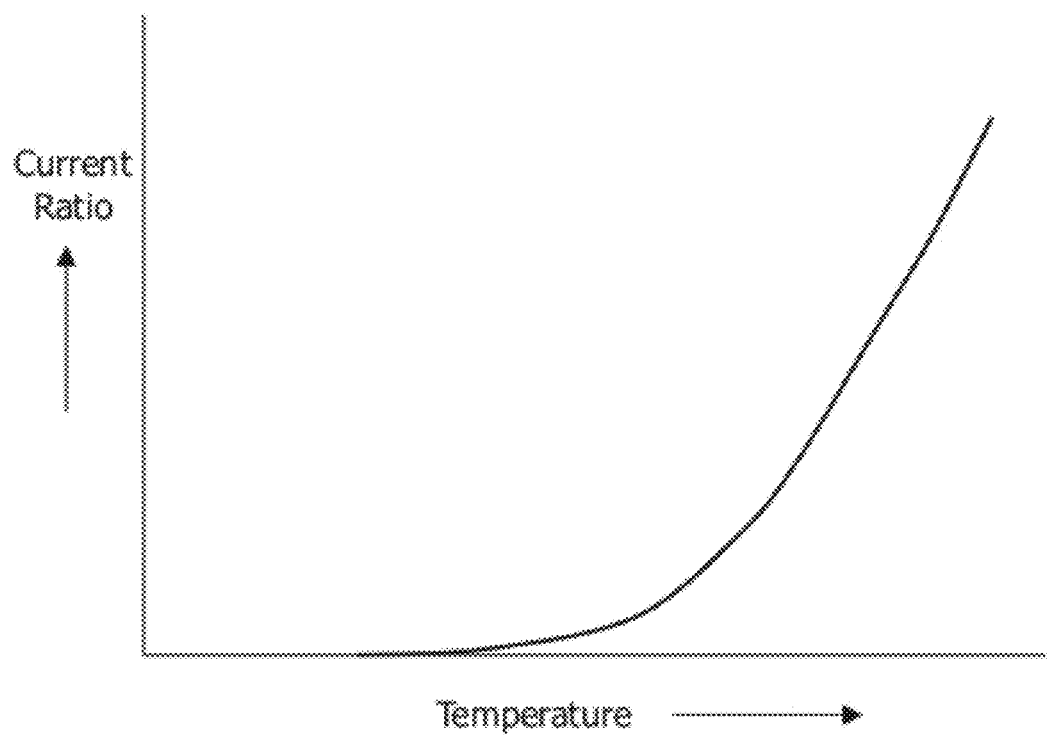
FIG. 2 illustrates a behavior of ratio between measured currents at two different wavelengths as a function of temperature.

A behavior of the ratio between the measured currents of the two sensors at the two wavelengths as a function of temperature is shown in FIG. 2. As seen in the figure, at lower temperatures the ratio is much smaller and it is difficult to determine the temperature based on the ratio. However, as the ratio becomes larger, the temperature is easier to determine. Wavelength-dependent emission of a black body at temperature T is given by the Planckian law as follows:

$$I(\lambda, T) = \frac{2\pi h c^2}{\lambda^5} \cdot \frac{1}{\exp(hc/\lambda k_B T) - 1},$$

where the constants h, c and $k_B$ denote the planckian constant, the speed of light and the Boltzmann constant respectively. Thus for a filtered diode with a narrow bandwidth centered at $\lambda_1$, the photocurrent signal that will be generated in the photodiode when it is irradiated by light from the anode at temperature T will be proportional to $I(\lambda_1, T)$. The signal at the second photodiode whose narrow band pass filter is centered at another wavelength $\lambda_2$ will in turn be proportional to $I(\lambda_2, T)$. Thus the ratio of the photocurrents $I_{photo1}$ and $I_{photo2}$ of both photodiodes at temperature T will be given by:

$$\text{ratio}(T) = \frac{I_{photo1}(T)}{I_{photo2}(T)} = \frac{\lambda_2^5}{\lambda_1^5} \cdot \frac{\exp(hc/\lambda_2 k_B T) - 1}{\exp(hc/\lambda_1 k_B T) - 1}$$

Thus the ratio of the photocurrents is an unambiguous function of the temperature of the light emitting focal spot on the anode. As the anode will not behave exactly like an ideal black body radiator, the deviation of its spectral emission from the Planckian law is taken into account by the emission coefficient k ($\lambda$, T):

$$I_{non-ideal}(\lambda, T) = k(\lambda, T) \cdot \frac{2\pi h c^2}{\lambda^5} \cdot \frac{1}{\exp(hc/\lambda k_B T) - 1}$$

The emission coefficient can normally be considered as wavelength independent, if the two wavelengths are close to each other. In another embodiment, the sensor element 150 may include three sensors. An advantage of having three sensors is that estimation will improve because this arrangement will take into consideration a linear dependence of the emission coefficient as a function of wavelength instead of considering it a constant. Similarly, in other embodiments, the sensor element 150 could have four or more sensors. Such an arrangement would allow for taking into consideration a quadratic behavior between the emission coefficient and wavelength and so on.

When a high voltage is applied between the electron emitter and the anode, the electrons get accelerated towards the rotating anode. However, even without application of the high voltage, the emitter can remain in ON state where it is heated up to its normal working temperature. During this period when the emitter is ON, there is, typically, some light from the emitter that gets reflected through the focal spot and into the hollow tube. This reflected light entering the hollow tube could cause faulty determination of focal spot temperature. Therefore, the effect of the reflected light on the actual sensor reading needs to be countered.

In the description herein above, the sensors in the sensor element 150 are adapted to measure light in the visible range of the electromagnetic spectrum. As known to a person skilled in the art, in other embodiments, it is also possible to have sensors that are adapted to measure infrared radiation from the focal spot. Such modifications to the described arrangement should be construed as part of the present invention. For ease of explanation, the sections below describe various embodiments using visible light for detection and measurement purposes. It should not be considered limiting.

Figure 3:
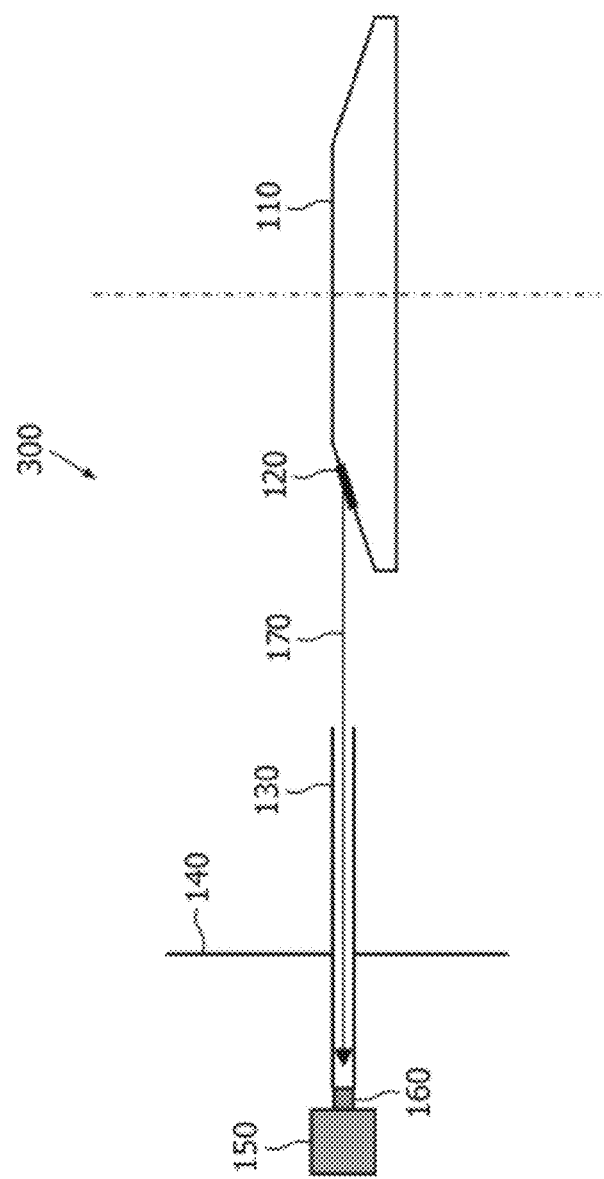
FIG. 3 illustrates a second embodiment of an x-ray tube arrangement.

FIG. 3 illustrates another embodiment of the x-ray tube 300 showing portions of the x-ray tube 100 with the rotatable anode 110, the hollow tube 130, and the sensor element 150. In the embodied arrangement, the hollow tube 130 passes through the x-ray tube wall 140 such that the collector end of the hollow tube 130 is inside the x-ray tube, while the emitter end of the hollow tube is outside the x-ray tube and is placed close to the sensor element. The sensor element 150 is in direct line of sight of the focal spot 120 through the hollow tube 130. In the presently embodied arrangement, since the hollow tube 130 passes through the x-ray tube wall 140, there is no window on the x-ray tube wall. Instead, the window 160 is affixed to the emitter end to prevent any x-ray from passing on to the outside. The sensor element 150 is similar to the one described in FIG. 1. In FIG. 3, the sensor element 150 is shown as being attached to the window 160. However, this is not mandatory. The sensor element 150 may be spaced by a distance from the window 160 but kept within distance that enables the sensor element 150 to sufficiently detect the visible light emanating from the hollow tube.

Figure 4:
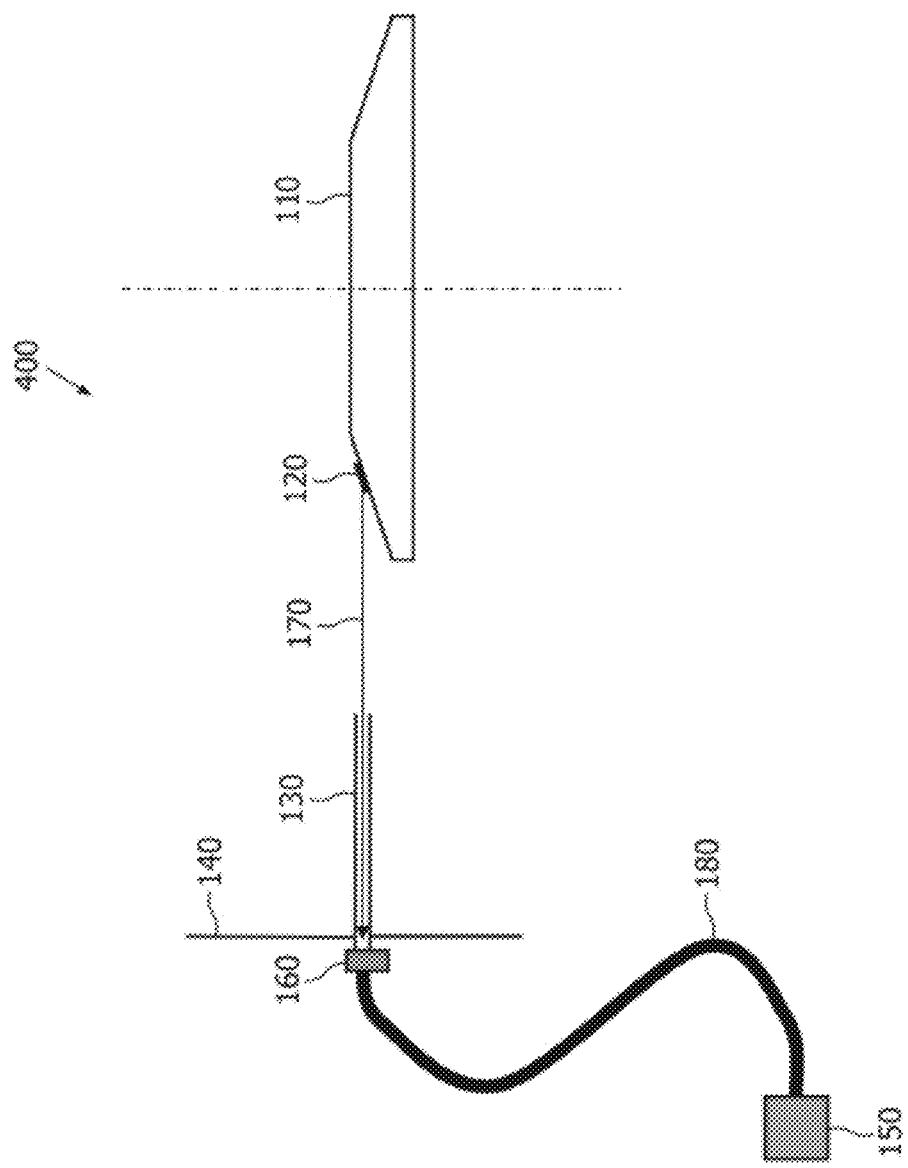
FIG. 4 illustrates a third embodiment of an x-ray tube arrangement.

FIG. 4 illustrates another embodiment of the x-ray tube 400 showing portions of the x-ray tube 100. In the embodied arrangement, the emitter end that is outside the x-ray tube is coupled to a fiber optic element 180 to convey the light 170 from the focal spot to the sensor element 150. In the currently embodied arrangement, the sensor element 150 may still be considered as being in line of sight of the focal spot 120 through the fiber optic element 180 and the hollow tube 130 since the light 170 from the focal spot 120 travels through the hollow tube 130 and the fiber optic element 180 to strike the sensor element 150. An advantage of this arrangement is that the sensor element 150 need not be situated immediately in front of the emitter end of the hollow tube. Further, using the fiber optic element 180 will not result in any loss of signal strength because of the property of total internal reflection. However, the coupling of the fiber optic element 180 to the emitter end of the hollow tube 130 needs to be carefully and accurately made.

Figure 5:
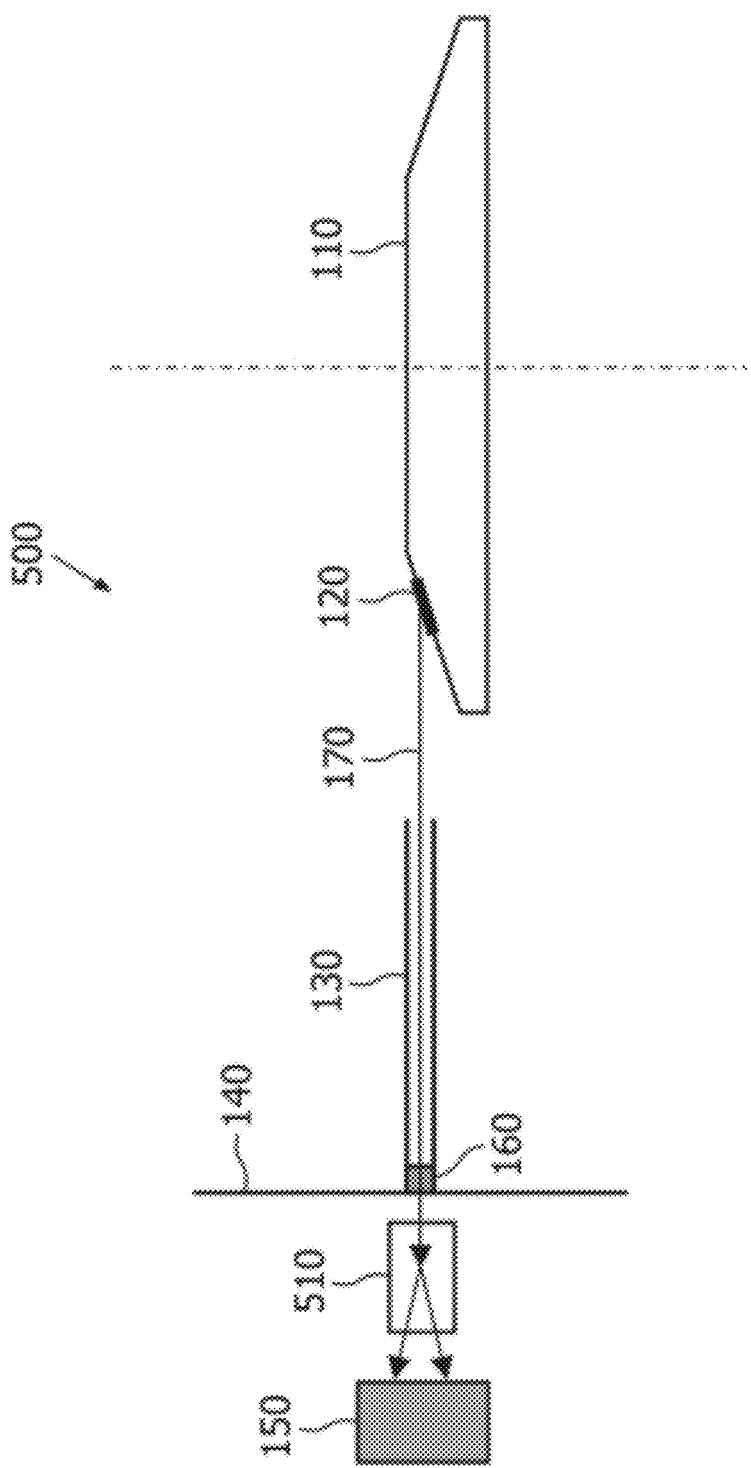
FIG. 5 illustrates a fourth embodiment of an x-ray tube arrangement.

In yet another embodiment as shown in FIG. 5, an arrangement of the x-ray tube 500 includes a prism 510 placed between the window 160 and the sensor element 150 as shown in the figure. The prism 510 could be made of glass or any other suitable material. The prism 510 is arranged such that light coming out of the emitter end of the hollow tube 130 and through the window 160 is split by the prism into two or more wavelengths traveling in different paths i.e., the prism 510 splits the light spatially. Each of the wavelengths can be suitable detected by the two or more sensors located within the sensor element 150. An advantage of using the prism 510 is that it allows the sensors in the sensor element 150 (which typically are placed next to one another) to image the same focal spot area whereas without using the prism 510, the sensors could image different focal spot areas that are slightly shifted from one another.

Figure 6:
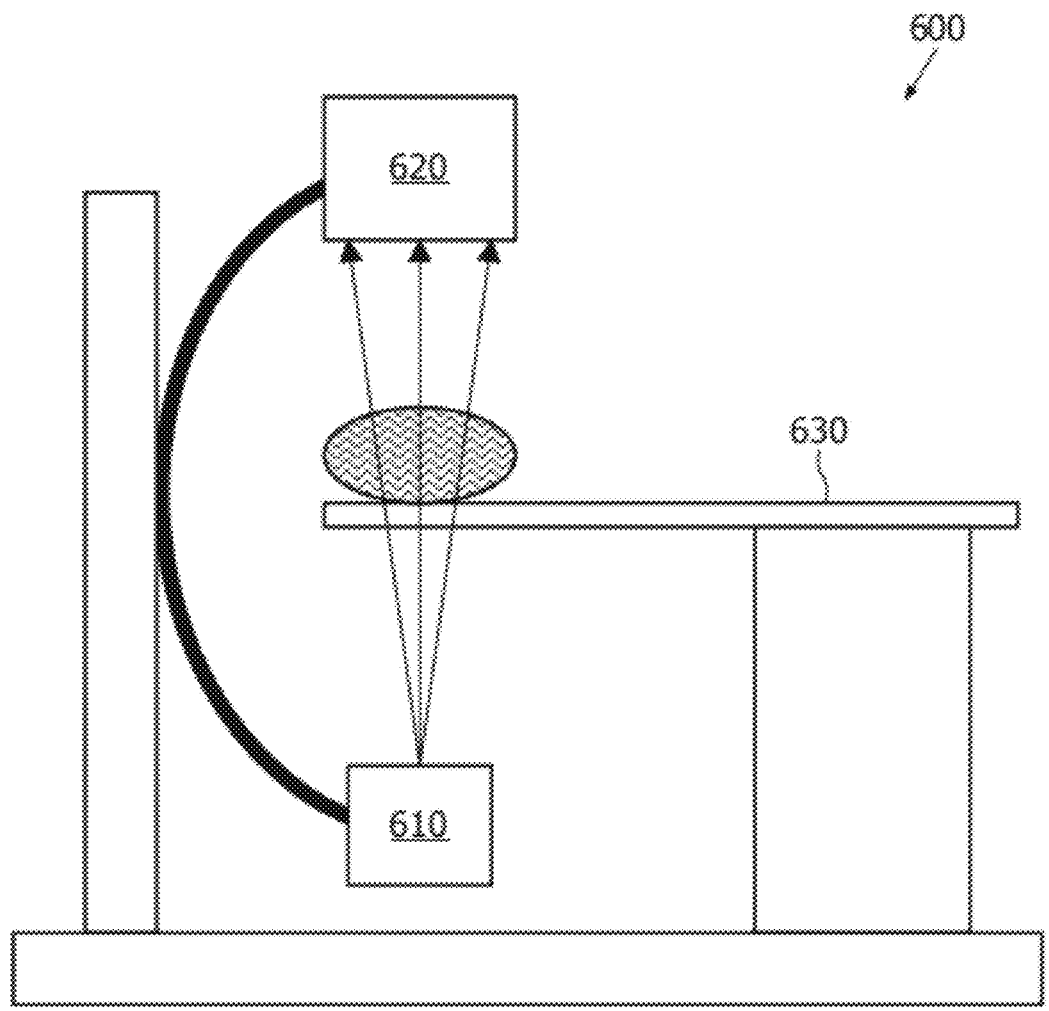
FIG. 6 illustrates an x-ray imaging apparatus that includes an x-ray tube in accordance with the arrangement shown in one of FIGS. 1, 3-5.

FIG. 6 illustrates an x-ray imaging apparatus 600 that includes the x-ray tube 610 containing one of the three embodied arrangements illustrated in FIGS. 1, 3 and 4 in addition to an x-ray detector 620, and an object imaging structure 630. The object imaging structure 630, in medical applications can be a patient table or a gantry. In industrial applications, the object imaging structure 630 can be any structure designed to hold the object to be imaged in a desired orientation. It must also be understood that in some other embodiment, one or more features from FIGS. 1, 3 and 4 may be combined together to gain advantage from such combination. These modifications should be considered as being within the scope of the invention.

Figure 7:
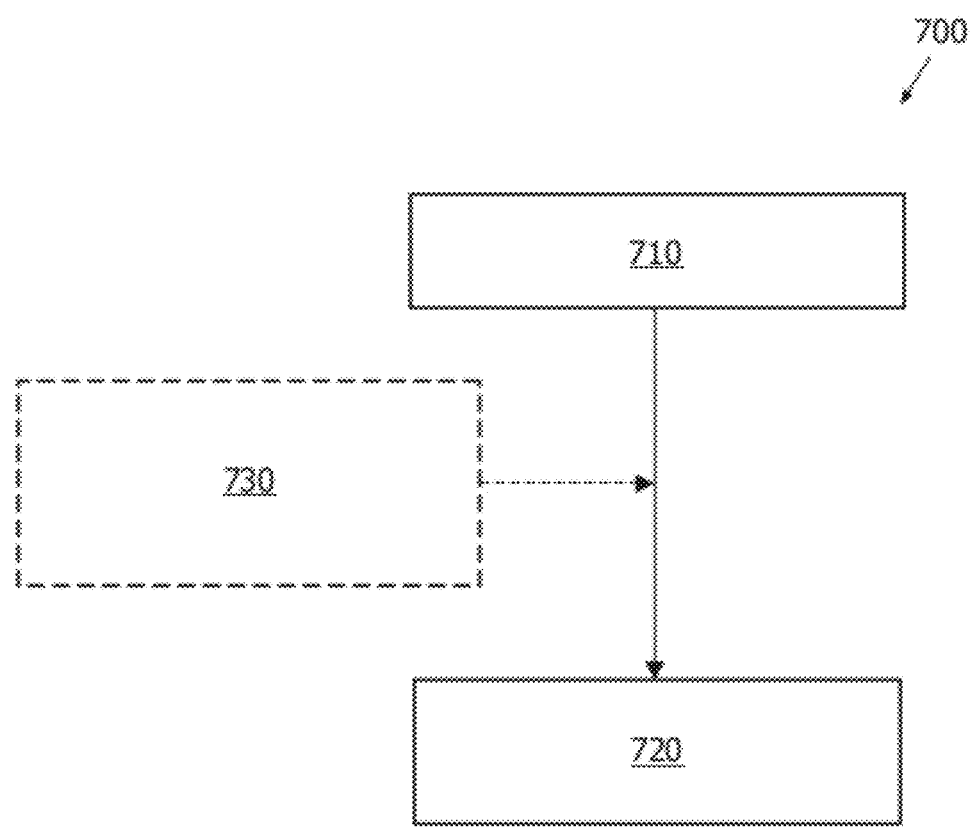
FIG. 7 is a flowchart of a method of determining focal spot temperature.

FIG. 7 illustrates a flow chart 700 that depicts a possible method of determining focal spot temperature using at least one of the embodiments of the x-ray tube illustrated in FIGS. 1, 3 and 4. It includes measuring the intensities of light at two or more wavelengths that is transmitted from the collector end to the emitter end of the hollow tube. As described previously, the sensor element detects the light from the hollow tube. The sensor element includes two or more sensors, each sensor having a narrow band filter arranged to permit a specific wavelength range to be detected by that particular sensor. The method includes measuring 710 the intensities of light at two or more wavelengths when the electron beam emitter is in operation. The method further includes determining 720 the temperature of the focal spot based on the measured intensities of light. It must be noted that the currents generated by the sensors are proportional to the intensities of light detected by the sensors. In one embodiment, a ratio of the two currents can be used to determine the temperature at the focal spot. The value of the ratio obtained for the corresponding readings of the shorter wavelength over the longer wavelength gets larger with increasing temperature.

In some embodiments, the method also includes a calibration step 730, to remove the effects of detecting light emitted from the electron emitter and reflected at the focal spot. The calibration step removes the reflected component out of the detected light by detecting the light from the emitter end of the hollow tube when the high voltage is not applied across the electron emitter and the rotatable anode. This means that there will be no electrons striking the rotatable anode and ensuring that any light entering the collector end of hollow tube is entirely the light reflected from the focal spot but emitted at the electron emitter. The measured intensity of light and thereby the current can then be subtracted from the measured currents when the x-ray tube is fully in operation.

Further, it should be noted that while the present application describes the measurement of focal spot temperature using electromagnetic radiation in the visible light range, it is also possible to apply the technique for measurement in infrared range. Accordingly, the choice of the sensors in the sensor element 150 needs to be modified. An advantage of implementing this technique in the visible regime is that the cost of the sensors is low and the sensors are easy to integrate. Measurement in the infrared regime takes the cost of the sensors higher when compared to the measurement in the visible range. However, with the advancements in technology in the field of semiconductors, the cost of sensors will only keep reducing and may prove to be just as efficient.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A method of determining temperature of a focal spot on a rotatable anode of an x-ray tube, comprising:
   measuring intensities of light at two or more wavelengths emitted from the focal spot on the rotatable anode when an electron beam emitter of the x-ray tube is in operation, wherein measuring includes (i) receiving electromagnetic radiation emitted from the focal spot at a first end of a hollow tube and transmitting the received electromagnetic radiation through a second end of the hollow tube, (ii) detecting the electromagnetic radiation transmitted from the second end of the hollow tube via a sensor element that includes at least two sensors, and (iii) allowing passage of the electromagnetic radiation via a window positioned to establish a line of sight between the focal spot and the sensor element through the second end of the hollow tube, while preventing x-rays from striking the sensor element; and determining the temperature of the focal spot on the rotatable anode based on the measured intensities of light.

2. The method of claim 1, comprising:
compensating for intensity of light reflected at the rotatable anode from the electron beam emitter when no voltage is applied across the electron beam emitter and the rotatable anode, wherein compensating includes calibrating to remove a reflected component out of a detected intensity of light by (i) detecting light from the second end of the hollow tube when a high voltage is not applied across the electron emitter and the rotatable anode during a calibration and (ii) subtracting (ii)(a) a measured current of a corresponding intensity of light of the calibration from (ii)(b) measured currents of the intensities of light when the x-ray tube is fully in operation.

3. The method of claim 1, further comprising:
coupling an optic fiber to the second end of the hollow tube, via the window, to provide visible light to the at least two sensors.

4. The method of claim 1, further comprising:
arranging a prism between (i) the window at the second end of the hollow tube and (ii) the sensor element to split the electromagnetic radiation from the second end of the hollow tube into two or more different wavelengths.

5. The method of claim 1, wherein the electromagnetic radiation is in at least one of a visible range or an infrared range.

6. The method of claim 1, wherein allowing passage of the electromagnetic radiation via the window comprises allowing via a window that includes lead glass.

7. The method of claim 1, wherein receiving electromagnetic radiation emitted from the focal spot at the first end of a hollow tube and transmitting the received electromagnetic radiation through the second end of the hollow tube further comprises receiving at the first end of the hollow tube located inside the x-ray tube and transmitting at the second end of the hollow tube located outside the x-ray tube.

* * * * *